United States Patent [19]

Dona et al.

[11] Patent Number: 5,105,692
[45] Date of Patent: Apr. 21, 1992

[54] POSITIONING DEVICE HAVING STATIC FLUID BEARINGS

[75] Inventors: Marinus J. J. Dona; Johannes M. M. Swinkels, both of Eindhoven, Netherlands

[73] Assignee: U.S. Philips Corporation, New York, N.Y.

[21] Appl. No.: 619,169

[22] Filed: Nov. 26, 1990

[30] Foreign Application Priority Data

Apr. 27, 1990 [NL] Netherlands .................. 9001012

[51] Int. Cl.$^5$ .................. B23B 3/12; B23B 21/00
[52] U.S. Cl. .................. 82/123; 82/12; 82/137; 82/149
[58] Field of Search .................. 82/117, 132, 137, 141, 82/173, 12, 123, 149

[56] References Cited

U.S. PATENT DOCUMENTS

| | | | |
|---|---|---|---|
| 2,895,386 | 7/1959 | Mann | 409/118 |
| 3,128,657 | 4/1964 | Hebert | 82/12 X |
| 4,172,398 | 10/1979 | Asmanes | 82/158 X |
| 4,417,489 | 11/1983 | Liu | 82/1.11 |
| 4,552,045 | 11/1985 | Inoue et al. | 82/132 |
| 4,698,575 | 6/1987 | Bouwer | 318/640 |
| 4,833,764 | 5/1989 | Gühring | 29/40 |

FOREIGN PATENT DOCUMENTS

| | | |
|---|---|---|
| 551713 | 5/1986 | Australia . |
| 254526 | 1/1988 | European Pat. Off. . |
| 3643832 | 6/1988 | Fed. Rep. of Germany . |
| 3815428 | 11/1989 | Fed. Rep. of Germany . |
| 1285914 | 8/1972 | United Kingdom . |

*Primary Examiner*—Steven C. Bishop
*Attorney, Agent, or Firm*—Brian J. Wieghaus

[57] ABSTRACT

A machine tool comprising a third carriage which is guided along a circular cylindrical guide of a second carriage by means of a static fluid bearing and which can thus rotate about an axis of rotation which coincides with a centerline of the circular cylindrical guide. A working point of a tool fastened to the third carriage lies on the axis of rotation so that an angular adjustment of the tool effected by rotation of the third carriage can take place independently of a position adjustment of the working point effected by a displacement of the second carriage and a first carriage. The machine tool can be used for the processing of surfaces, in particular in the manufacture of linear and circular Fresnel lenses for projection television screens by means of a cutting tool.

20 Claims, 5 Drawing Sheets

POSITIONING DEVICE HAVING STATIC FLUID BEARINGS

CROSS-REFERENCE TO RELATED APPLICATION

This application relates to U.S. application Ser. No. 07/619,170, filed simultaneously herewith on Nov. 26, 1990, entitled "Machine Tool With Movable Positioning Device" which discloses and claims a machine tool having a positioning device mounted on a carrier which is coupled to the machine tool frame by a static fluid bearing, and to U.S. application Ser. No. 07/618,278 also filed simultaneously herewith entitled "Support Device For A Drum" which discloses and claims a support device for a rotatable drum of a machine tool.

BACKGROUND OF THE INVENTION

The invention relates to a positioning device for machining a workpiece fastened to a rotatable support, which device is provided with a longitudinal carriage movable in an x-direction, on which is present a transverse carriage which is movable relative to the longitudinal carriage in a y-direction perpendicular to the x-direction, while a $\phi$-carriage is present on the transverse carriage and capable of rotating relative to the transverse carriage about an axis of rotation which is perpendicular to the x-direction and y-direction.

A positioning device of the type described above and functioning as a universal lathe is known from U.S. Pat. No. 2,051,127. In this known positioning device, a holder for a machining tool is movable relative to the $\phi$-carriage along a straight guide which is present on the $\phi$-carriage. The $\phi$-carriage is attached to the transverse carriage and is rotatable relative to the latter about a vertical axis of rotation by means of a swiveling-plate present on the transverse carriage. The transverse carriage is movable relative to the longitudinal carriage in the y-direction along a straight guide rail attached to the longitudinal carriage. A drawback of the known lathe is that an x-position and y-position of a tool tip, once set, will change if the $\phi$-carriage is rotated about the axis of rotation. If a desired x-position and y-position of the tool tip are to be maintained upon rotation of the $\phi$-carriage, the two positions have to be corrected by means of a calculated displacement of the longitudinal carriage and the transverse carriage, which generally does not benefit the positioning accuracy of the tool tip. A further drawback of the known lathe is the stacking of the various carriages, which adversely affects the rigidity of the construction, and thus the positioning accuracy of the tool. In addition, an inaccuracy in the movement of the longitudinal carriage or the transverse carriage in a direction parallel to the axis of rotation always leads to a deviation in the tool position in the said direction.

SUMMARY OF THE INVENTION

The invention has for its object to provide a positioning device in which the drawbacks referred to are avoided, so that positioning of a tool relative to a workpiece to be machined can be effected with a relatively high accuracy.

The positioning device according to the invention is for this purpose characterized in that the $\phi$-carriage is rotatably guided along a cylindrical guide present on the transverse carriage and forming a boundary of a circular cylinder which has a centreline perpendicular to the x-direction and the y-direction and coinciding with the axis of rotation, a tip of a tool fastened to the $\phi$-carriage lying close to the axis of rotation running through the workpiece during operation.

The invention is based on the understanding that an x-position and y-position, once set, of a working point of the tool situated near a tip of the tool and to be defined more accurately in the description of the Figures, will not change if the $\phi$-carriage is rotated about a virtual axis of rotation which runs through the said working point. It is achieved in this way that the x-position and the y-position of the working point of the tool can be accurately set independent of a change in an angle at which the tool machines the workpiece.

A particular embodiment of a positioning device according to the invention, which provides a substantially frictionless and very rigid guiding of the transverse carriage and the $\phi$-carriage, is characterized in that the transverse carriage is guided along a flat wall of the longitudinal carriage parallel to the y-direction by means of a static fluid bearing, while the $\phi$-carriage is guided, also by means of a static fluid bearing, along the circular cylindrical guide of the transverse carriage.

A further embodiment of a positioning device according to the invention, which provides a substantially frictionless and very rigid guiding of the longitudinal carriage and the transverse carriage, is characterized in that the longitudinal carriage and the transverse carriage are guided along a base surface which is perpendicular to the axis of rotation by means of static fluid bearings. It is achieved in this way that inaccuracies in the position of the longitudinal carriage perpendicular to the x-direction, which can arise as a result of inaccuracies in the flatness of the base surface, have no influence on the position of the transverse carriage.

A still further embodiment of a positioning device according to the invention is characterized in that the $\phi$-carriage is guided along the base surface by means of a static fluid bearing. It is achieved by this, not only that the guiding of the $\phi$-carriage is substantially frictionless, but also that a main component of a force exerted by the workpiece on the tool in a direction parallel to the axis of rotation is directly transmitted to the base surface, which results in a very high rigidity of the positioning device. It is achieved in addition that inaccuracies in the position of the transverse carriage in the direction of the axis of rotation resulting from inaccuracies in the flatness of the base surface have no influence on the position of the $\phi$-carriage.

A particular embodiment of a positioning device according to the invention, which provides a substantially frictionless guiding of the longitudinal carriage, is characterized in that the longitudinal carriage comprises a first part, which is guided along a base surface which is perpendicular to the axis of rotation by means of a static fluid bearing, and a second part, which is guided along a support surface which is perpendicular to the y-direction by means of a static fluid bearing, the first part and the second part being mechanically coupled by means of cross hinges built up from plate springs, which parts of the longitudinal carriage are rotatable relative to one another under spring force of the cross hinges about a pivot axis which coincides substantially with a line of intersection of the base surface and the support surface. It is achieved by the use of the said cross hinges that inaccuracies in the perpendicularity between the support surface and the base surface substantially do not influence the accuracy with which the two said parts of the longitudinal carriage are guided along the base surface and support surface, respectively.

A further embodiment of a positioning device according to the invention, which provides a φ-carriage drive free from play and hysteresis, is characterized in that the φ-carriage is rotatable about the axis of rotation by means of a drive which comprises a shaft extending in radial direction relative to the axis of rotation and carrying a friction wheel which bears on a guide rail attached to the φ-carriage, which rail has the shape of a circular arc whose centre lies on the axis of rotation, this friction wheel being driven by a motor attached to the transverse carriage.

BRIEF DESCRIPTION OF THE DRAWINGS

The invention will be explained in more detail with reference to the drawing, in which.

DESCRIPTION OF THE PREFERRED EMBODIMENTS

Figure 1:
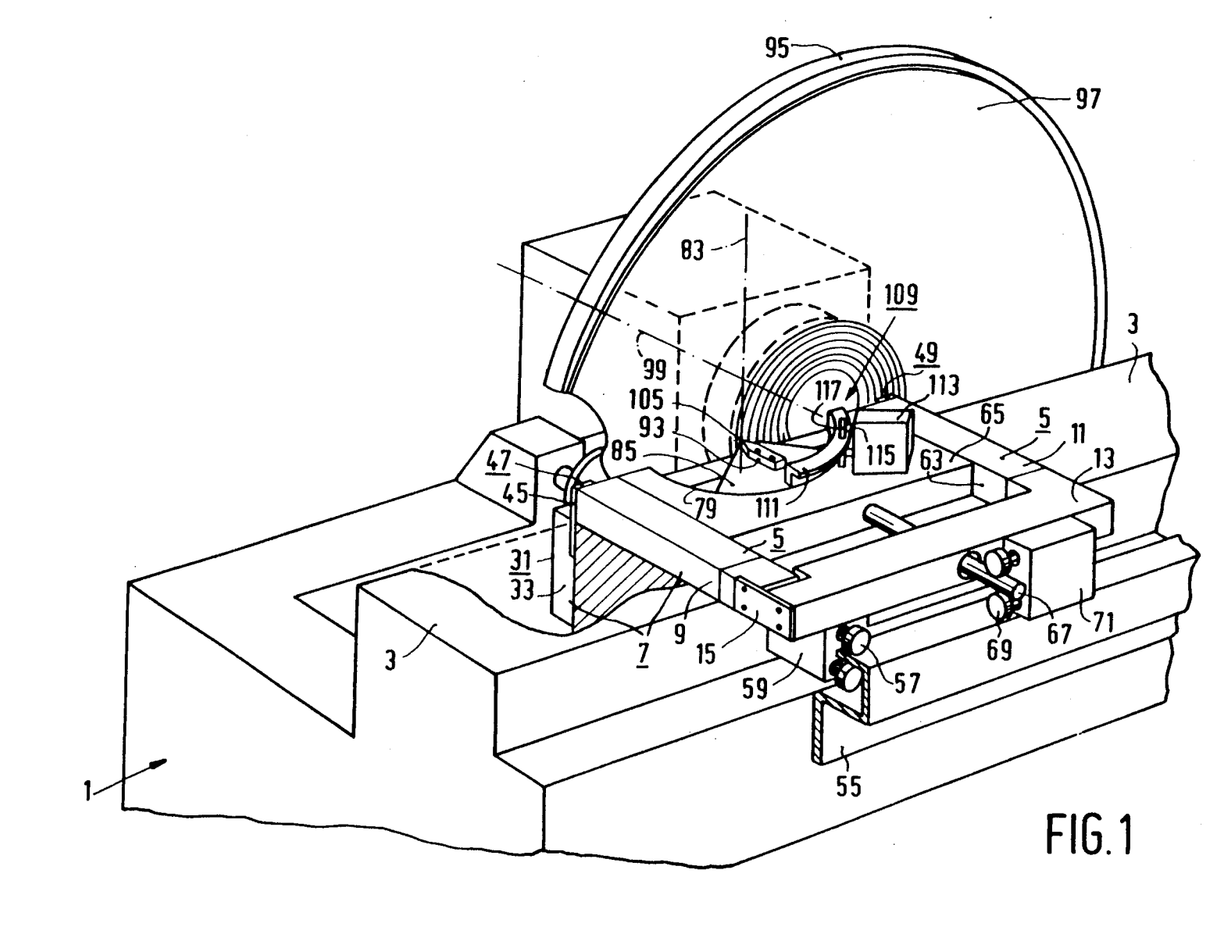
FIG. 1 shows a first embodiment of a positioning device according to the invention.
Figure 4:
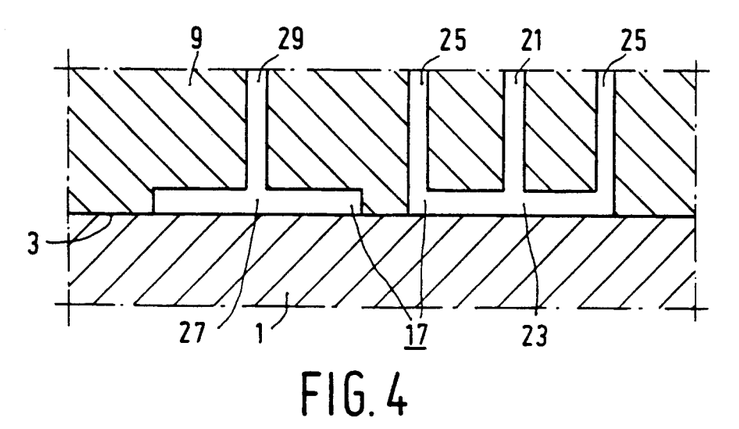
FIG. 4 shows a few details of the cross-section of the positioning device according to FIG. 3.
Figure 5:
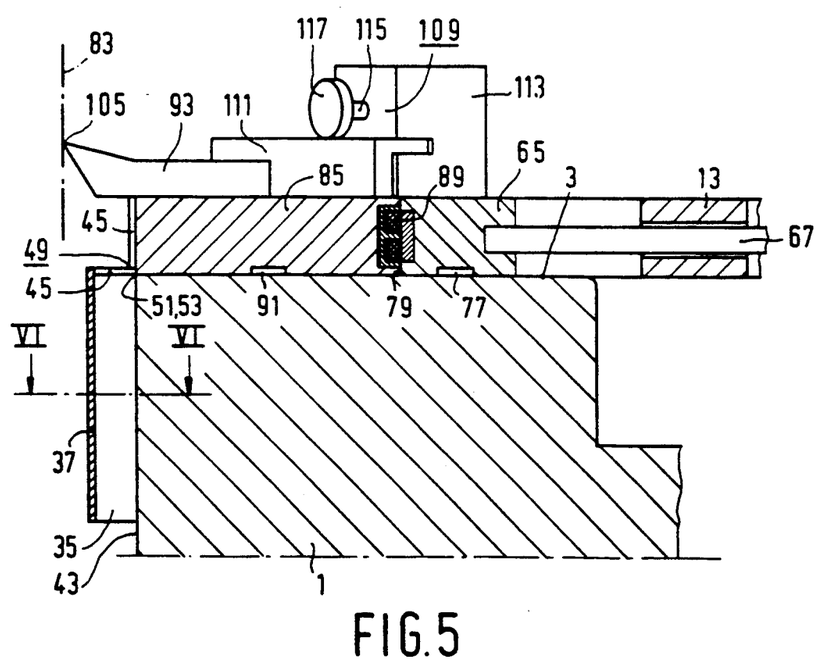
FIG. 5 shows a cross-section of the positioning device taken on the line V—V in FIG. 2.

The first embodiment of the positioning device illustrated in FIGS. 1–6 comprises a base surface 3 belonging to a frame 1, which surface is parallel to a first, or x, direction indicated in FIG. 1 and to a second, or y, direction, which is perpendicular to the x-direction. A first part 5 of a longitudinal or first, carriage 7 has two parallel beams 9 and 11 which are interconnected by a bridge 13 and a plate spring 15. The beams 9 and 11 are guided along the base surface 3 by static fluid bearings 17 and 19, respectively, which are known per se and indicated merely diagrammatically in FIG. 3. A few details of the static fluid bearing 17 are shown in FIG. 4. Fluid is supplied to a chamber 23 of the beam 9 via a channel 21 which is connected to a pressure source. Fluid is drained off via channels 25. An accurate position of the beam 9 relative to the base surface 3 in a direction transverse to the x- and y-directions is maintained in this case in that the fluid bearing 17 is pre-tensioned by means of a suitable underpressure in a chamber 27 which is provided in the beam 9 in a manner shown diagrammatically in FIG. 4. The chamber 27 is connected to a vacuum source through a channel 29. The static fluid bearing 19 of beam 11 is of a similar type as the bearing 17 shown in FIG. 4, and is consequently also pre-tensioned by means of an underpressure relative to the base surface 3.

Figure 6:
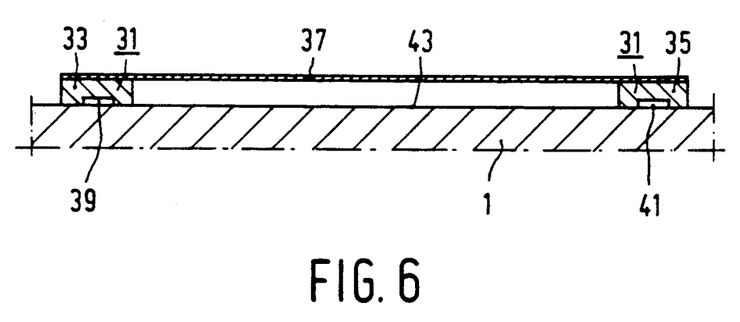
FIG. 6 shows a cross-section of the positioning device taken on the line VI—VI in FIG. 5.

A second part 31 of the first, or longitudinal, carriage 7 comprises, as can be seen in FIG. 6, two beams 33 and 35 which are interconnected by a plate-shaped flexible bridge 37 of aluminium. The beams 33 and 35 are guided along a support surface 43 transverse to the y-direction by means of static fluid bearings 39 and 41, respectively, of a type diagrammatically shown in FIG. 4. An accurate position of the longitudinal carriage 7 in the y-direction relative to the support surface 43 is maintained in this case in that the fluid bearings 39 and 41 are pre-tensioned by means of an underpressure in the known manner shown diagrammatically in FIG. 4.

Figure 7:
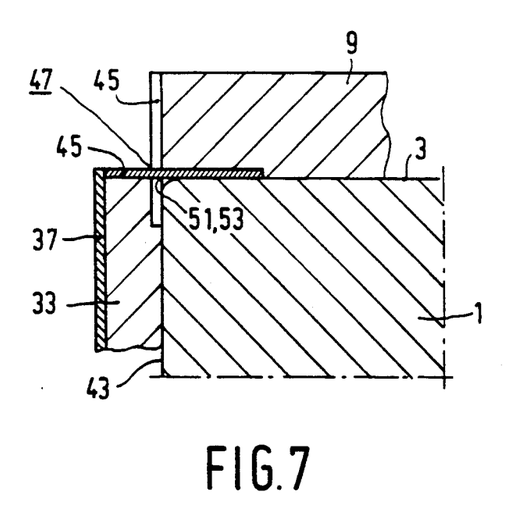
FIG. 7 shows a cross-section of the positioning device taken on the line VII—VII in FIG. 2.

The first part 5 and the second part 31 of the longitudinal carriage 7 are mechanically coupled by means of cross hinges 47 and 49 (see FIGS. 1 and 2) which are built up from plate springs 45. The beams 9 and 11 of the first part 5 of the longitudinal carriage 7 are coupled to the beams 33 and 35 of the second part 31 of the longitudinal carriage 7 by means of the cross hinges 47 and 49, respectively. It can be seen in the FIGS. 2 and 7 that the plate springs 45 are attached to the beams 9, 11 and 33, 35 in such a way that the first part 5 and the second part 31 of the longitudinal carriage 7 can be rotated relative to one another about a pivot axis 51, which substantially coincides with a line of intersection 53 between the base surface 3 and the support surface 43, under spring pressure of the cross hinges 47 and 49. The coupling by the cross hinges 47 and 49 achieves that an accurate and substantially frictionless guiding of the longitudinal carriage 7 along the base surface 3 and the support surface 43 is even possible in the case of any inaccuracies in the perpendicularity of the support surface 43 relative to the base surface 3. The longitudinal carriage 7 thus guided along the base surface 3 and the support surface 43 can be displaced in the x-direction by means of a drive mechanism, indicated only diagrammatically in FIG. 1, which is of a kind known per se with a straight guide rail 55 attached to the frame 1 and a friction wheel 57 which bears on the guide rail 55 and is driven by a motor 59 attached to the longitudinal carriage 7.

The beams 9 and 11 have flat walls 61 and 63, respectively, which are parallel to the y-direction and perpendicular to the base surface 3. A second, or transverse, carriage 65 is positioned between the beams 9 and 11 of the longitudinal carriage 7 and is displaceable relative to the longitudinal carriage 7 in the y-direction by means of a drive mechanism of a kind which is known per se, indicated only diagrammatically in FIGS. 1 and 2, with a shaft 67 attached to the transverse carriage 65 and a friction wheel 69 which bears on the shaft 67 and is driven by a motor 71 attached to the bridge 13 of the longitudinal carriage 7. In this construction, the second, or transverse, carriage 65 is guided along the flat walls 61 and 63 of the beams 9 and 11 of the longitudinal carriage 7 by static fluid bearings 73 and 75, respectively, of the type shown in FIG. 4 and discussed with reference to FIG. 4, which are represented only diagrammatically in FIG. 3. An accurate position in the x-direction of the transverse carriage 65 relative to the beams 9 and 11 is maintained in that the fluid bearings 73 and 75 are pre-tensioned by means of a suitable underpressure as discussed hereinbefore with reference to the fluid bearing 17 shown in FIG. 4. A distance in the x-direction between the beams 9 and 11 and between the beams 33 and 35, connected to the former by means of cross hinges 47 and 49, respectively, is determined by the dimensions of the transverse carriage 65. The bridge 13 between the beams 9 and 11 serves to keep the beams 9 and 11 in position relative to one another when the static fluid bearings 73 and 75 are not operational. Any differences in expansion in the x-direction between the transverse carriage 65 and the bridge 13 during operation are accommodated by bending of the plate spring 15. Furthermore, the transverse carriage 65 is guided along the base surface 3 by means of a static fluid bearing 77 of the type discussed with reference to FIG. 4 and indicated only diagrammatically in FIG. 3. The transverse carriage 65 is also kept in an accurate position relative to the base surface 3 in a direction transverse to the base surface 3 in that the fluid bearing 77 is pre-tensioned by means of an underpressure, as was discussed with reference to the fluid bearing 17 in FIG. 4.

Figure 2:
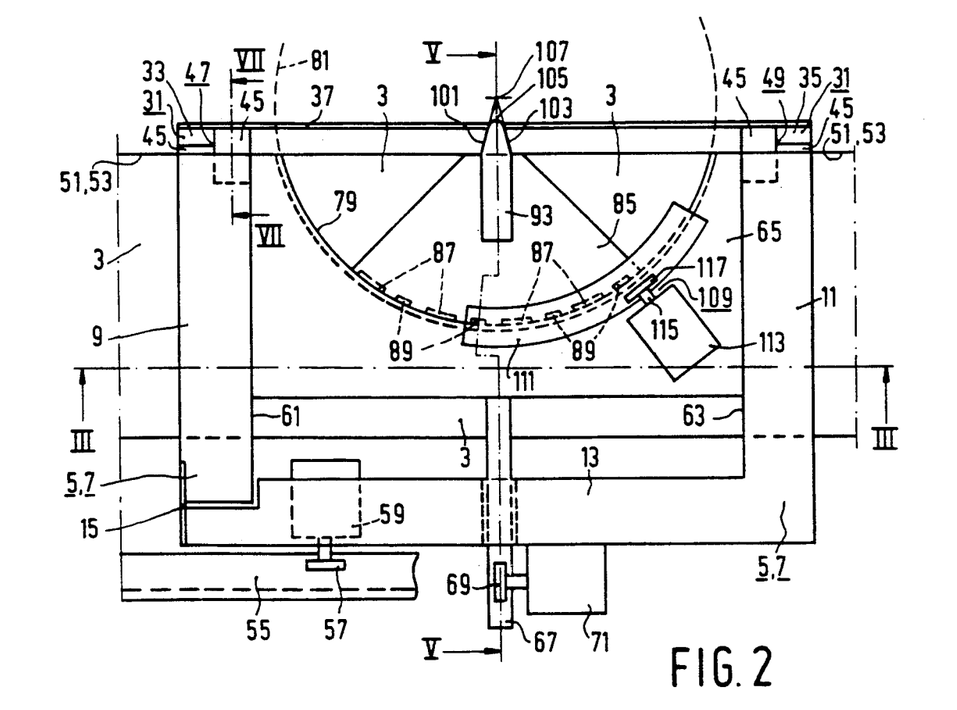
FIG. 2 shows a plan view of the positioning device of FIG. 1.
Figure 3:
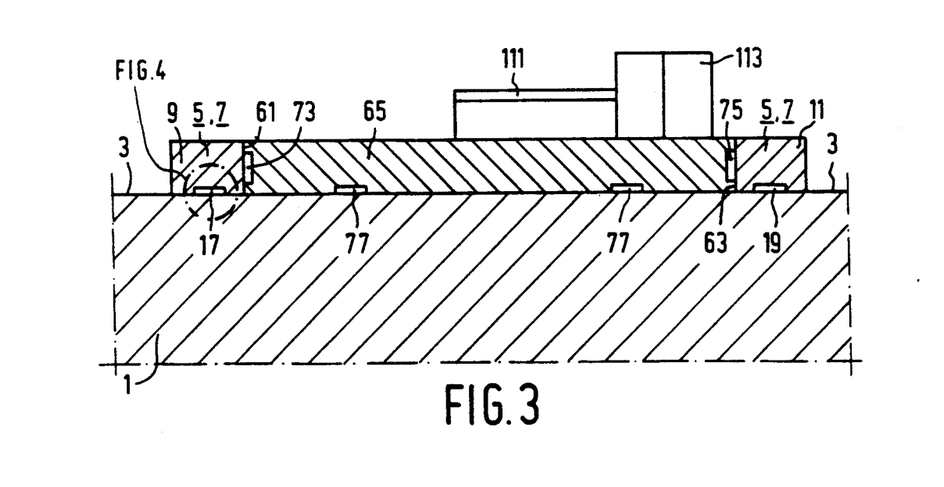
FIG. 3 shows a cross-section of the positioning device taken on the line III—III in FIG. 2.

The transverse carriage 65 has a circular cylindrical guide 79 which forms a boundary of an imaginary circular cylinder 81 indicated in FIG. 2 with a centreline 83 (see FIGS. 1 and 5) perpendicular to the base surface 3. A third, or $\phi$, carriage 85 is guided along the circular cylindrical guide 79 of the transverse carriage 65 by means of a static fluid bearing 87, which is indicated only diagrammatically in FIG. 2 and is again of the type shown in FIG. 4. The $\phi$-carriage 85 is kept in an accurate position relative to the transverse carriage 65, i.e. a radial position relative to the centreline 83, by pre-tensioning of the fluid bearing 87 by means of permanent magnets 89 indicated diagrammatically in FIG. 5. Furthermore, the $\phi$-carriage 85 is guided along the base surface 3 by means of a static fluid bearing 91 of the type shown in FIG. 4 and indicated diagrammatically in FIG. 5. The third, or $\phi$, carriage 85 is kept in an accurate position relative to the base surface 3 in a direction transverse to the base surface 3 in that the fluid bearing 91 is pre-tensioned by means of an underpressure in the same way as with the fluid bearing shown in FIG. 4.

The $\phi$-carriage 85 is rotatable along the circular cylindrical guide 79 of the transverse carriage 65 about an axis of rotation which coincides with the centreline 83 of the circular cylindrical guide. A cutting tool 93 is fastened to the $\phi$-carriage 85, with which tool a plate-shaped workpiece 97 clamped on a vertically positioned rotatable disc 95 can be machined. The disc 95 is rotatable about an axis of rotation 99 which is parallel to the y-direction. The cutting tool 93 has a first edge 101 and a second edge 103, as shown in FIG. 2. A common end of the first edge 101 and the second edge 103 forms a tip 105 of the tool 93. This tip 105 of the tool 93 is shown on an exaggerated scale in FIG. 2. A working point 107 of the tool 93 coincides with the point of intersection of the extension of the edge 101 and the extension of the edge 103, and lies close to the tip 105 of the tool 93. The tool 93 is fastened to the $\phi$-carriage 85 in such a way that the working point 107 of the tool as defined above lies on the axis of rotation 83 of the $\phi$-carriage 85. It is achieved in this way that an x-position and a y-position of the working point 107 of the tool 93 substantially do not change if the $\phi$-carriage 85 is rotated about the axis of rotation 83. Thus an adjustment of an angle at which the tool 93 machines the workpiece 97 can take place independently of an adjustment of an x-position and a y-position of the working point 107 of the tool.

The $\phi$-carriage 85 is rotated relative to the transverse carriage 65 about the axis of rotation 83 by means of a drive 109. The drive 109 comprises a guide rail 111 attached to the $\phi$-carriage 85. The guide rail 111 has the shape of a circular arc whose centre is situated on the axis of rotation 83. A drive motor 113 with an output shaft 115 is attached to the transverse carriage 65, the said output shaft being radially disposed relative to the axis of rotation 83. A friction wheel 117 attached to the shaft 115 bears on the guide rail 111 attached to the $\phi$-carriage 85. The drive 109 of the $\phi$-carriage 85 is substantially free from play and frictionless, so that an accurate angular adjustment substantially free from hysteresis of the tool 93 is possible.

In the case of the positioning device represented in FIG. 1, in which a workpiece 97 rotates about an axis of rotation 99 which is parallel to the y-direction, a main component of a force exerted on the tool 93 by the rotating workpiece 97 is transverse to the x-direction and substantially transverse to the base surface. Since the $\phi$-carriage has its bearings directly on the base surface 3, a high degree of rigidity is achieved and the displacement of the tip 105 of the tool 93 under the influence of the said force is minimal. The positioning device shown in FIG. 1 is particularly suitable for processing a so-called master destined for the manufacture of circular Fresnel lenses. In this process, an accurate pattern of concentric lens elements (cutting grooves) is applied at one side of such a plate-shaped master with the aid of the positioning device.

Figure 8:
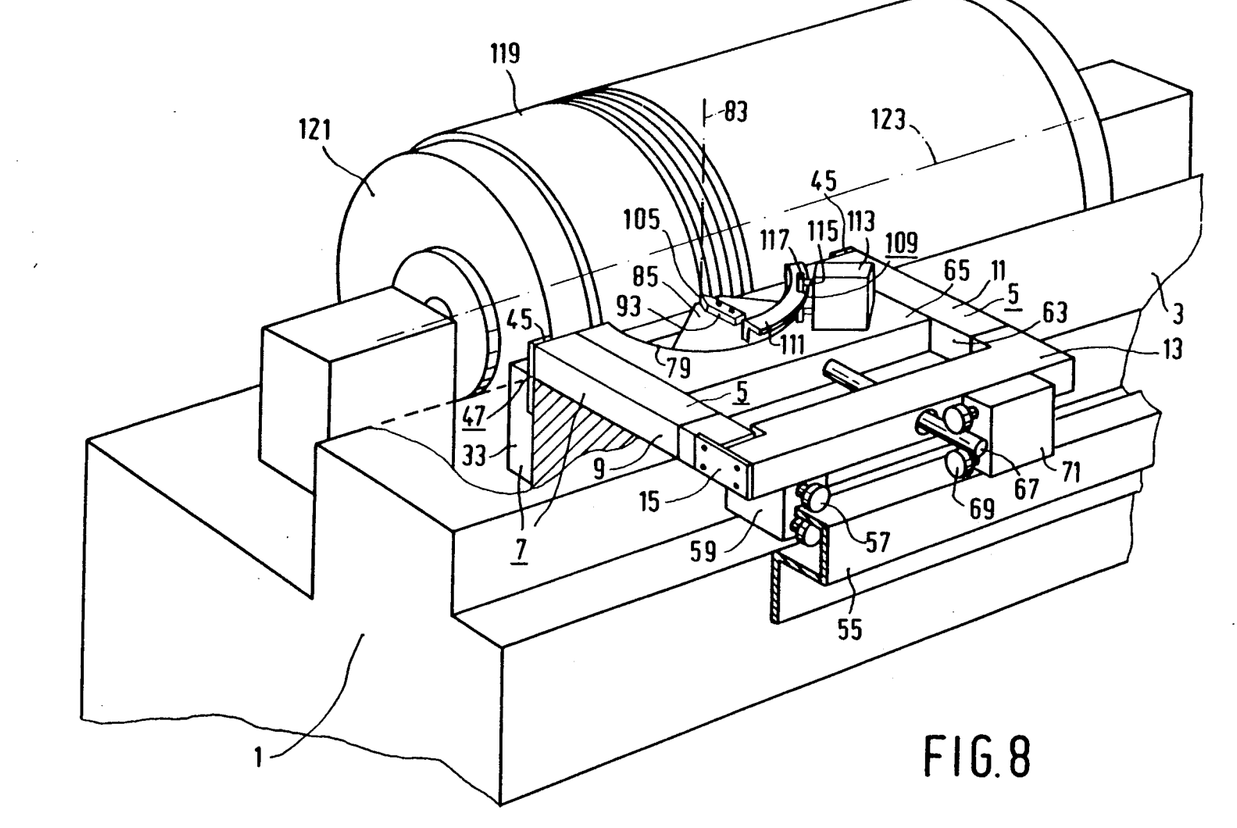
FIG. 8 shows a second embodiment of a positioning device according to the invention.

A second embodiment of a positioning device according to the invention shown in FIG. 8 differs from the first embodiment described above in that a plate-shaped workpiece 119 is clamped around a drum 121 which is attached to a rotatable support not shown in detail in FIG. 8, rotating about an axis of rotation 123 which is parallel to the x-direction. In the case of the positioning device shown in FIG. 8, again, a main component of a force exerted on the tool 93 by the rotating workpiece 119 is transverse to the x-direction and substantially transverse to the base surface 3, so that here also a high degree of constructional rigidity is obtained by means of a direct bearing of the $\phi$-carriage 85 on the base surface 3. The positioning device shown in FIG. 8 is suitable first and foremost for processing a master for the manufacture of linear Fresnel lenses. In this process, an accurate pattern of parallel, linear lens elements (cutting grooves) is applied by the tool 93 at one side of the workpiece 119 clamped around the drum 121.

It should be noted that a positioning device in which the longitudinal carriage, the transverse carriage and the $\phi$-carriage are positioned relative to one another in a manner other than the one described, or have their bearings in a manner other than the one described, may also possess a $\phi$-carriage which is rotatable about a so-called virtual axis of rotation whereby a tip of a tool fastened on the $\phi$-carriage is situated close to the virtual axis of rotation. Thus, for example, the longitudinal carriage and the transverse carriage may be guided along a common base surface by means of static fluid bearings, while the $\phi$-carriage is guided along a surface of the transverse carriage perpendicular to the axis of rotation and along the circular cylindrical surface of the transverse carriage by means of static fluid bearings. The fluid used in the static fluid bearings may be a gas or a liquid. Guiding of the $\phi$-carriage along the circular cylindrical surface of the transverse carriage may in this case obviously also take place in a conventional manner such as, for example, by means of a guide rail attached to the transverse carriage and roller members attached to the $\phi$-carriage. A conventional stacking of the carriages, in which the longitudinal carriage is displaceably guided along a straight guide of the frame by usual means such as roller members, the transverse carriage is placed on the longitudinal carriage and is displaceably guided along a straight guide of the longitudinal carriage relative to the longitudinal carriage by usual means such as roller members, while the φ-carriage is placed on the transverse carriage and is rotatably guided along a curved guide of the transverse carriage relative to the transverse carriage by means of roller members, is also possible in combination with the virtual axis of rotation described hereinbefore. In this case, generally, a less high constructional rigidity and positioning accuracy are achieved than in the embodiment of a positioning device shown in FIG. 1 or FIG. 8, though sufficiently high for many applications.

The two embodiments of a positioning device according to the invention described above make it possible to carry out a cutting operation on a plate-shaped workpiece. This workpiece may in principle be made of any machinable metal such as, for example, copper, aluminium, or brass, the workpiece being machined with a tool suitable for the purpose, such as a diamond chisel, while alternatively it may be made of a machinable synthetic material such as, for example, polymethyl methacrylate or delrin.

Besides masters for Fresnel lenses for use as projection television screens, other products may also be manufactured by means of the positioning device. In particular, the positioning device makes it possible to planarize a plate-shaped workpiece with a relatively high accuracy. For this purpose, a horizontal instead of a vertical positioning of the workpiece, which is then machined at its lower side by means of a suitably adapted positioning device according to the first embodiment, may then be used with the advantage that chip disposal is more efficient.

Finally, it should be noted that in addition to the cutting operations discussed other types of operations are also possible with the aid of the positioning device. In this connection, grinding and lapping operations may be mentioned, and also laser operations such as, for example, laser welding.

We claim:

1. A machine tool having
   a) a rotatable support for holding a workpiece,
   b) a planar base surface,
   c) a first carriage bearing on said base surface and moveable in a first direction,
   d) a second carriage coupled to said first carriage and moveable in a second direction perpendicular to said first direction,
   e) a third carriage coupled to said second carriage and rotatable about an axis of rotation perpendicular to said first and second directions, said third carriage including a tool holder, wherein the improvement comprises:
   f) said second carriage and said third carriage having complementary cylindrical bearing surfaces defined by a circular cylinder having a centerline coinciding with said axis of rotation, said third carriage being rotatably guided about said axis of rotation by said cylindrical bearing surfaces, and
   said machine tool further comprising a common bearing surface perpendicular to said axis of rotation on which said second and third carriages commonly bear.

2. A machine tool according to claim 1, wherein said common bearing surface for said second and third carriages consists of said planar base surface.

3. A machine tool according to claim 2, wherein said first and second carriages comprise complementary planar guide walls parallel to said second direction, which guide walls comprise static fluid bearings, said second carriage being guideably moveably with respect to said first carriage along said planar guide walls, and said complementary cylindrical guides of said second and third carriages comprise static fluid bearings.

4. A machine tool according to claim 3, wherein said first, second, and third carriages each comprise static fluid bearings cooperable with said base surface.

5. A machine tool according to claim 4, further comprising a planar support surface perpendicular to said second direction and defining a line of intersection between said base and support surfaces, and wherein said first carriage comprises a first part having a said static fluid bearing cooperable with said planar base surface, a second part having a static fluid bearing cooperable with said support surface, and cross-hinges comprising plate springs for coupling said first and second parts together, said hinges being arranged such that said first and second parts are rotatable relative to each other under spring force about a pivot axis which coincides substantially with said line of intersection between said base and support surfaces.

6. A machine tool according to claim 5, further comprising drive means for rotating said third carriage about said axis of rotation, said drive means comprising an arcuate guide rail on said third carriage defined by a circular arc whose center conincides with said axis of rotation, a shaft extending radially with respect to said axis of rotation, a friction wheel on said shaft for driving said arcuate guide rail, and a motor attached to said second carriage for driving said shaft.

7. A machine tool according to claim 6, wherein a plurality of said static bearings comprise means for biasing their respective surfaces together.

8. A machine tool according to claim 5, wherein a plurality of said static bearings comprise means for biasing their respective surfaces together.

9. A machine tool according to claim 4, wherein a plurality of said static bearings comprise means for biasing their respective surfaces together.

10. A machine tool according to claim 3, wherein a plurality of said static bearings comprise means for biasing their respective surfaces together.

11. A machine tool according to claim 2, wherein a plurality of said static bearings comprise means for biasing their respective surfaces together.

12. A machine tool according to claim 1, wherein a plurality of said static bearings comprise means for biasing their respective surfaces together.

13. A machine tool according to claim 1, wherein said first and second carriages comprise complementary planar guide walls parallel to said second direction, which guide walls comprise static fluid bearings, said second carriage being guideably moveable with respect to said first carriage along said planar guide walls, and said complementary cylindrical guides of said second and third carriages comprise static fluid bearings.

14. A machine tool according to claim 1, further comprising a planar support surface perpendicular to said second direction and defining a line of intersection between said base and support surfaces, and wherein said first carriage comprises a first part having a said static fluid bearing cooperable with said planar base surface, a second part having a static fluid bearing cooperable with said support surface, and cross-hinges comprising plate springs for coupling said first and second parts together, said hinges being arranged such that said first and second parts are rotatable relative to each other under spring force about a pivot axis which coincides substantially with said line of intersection between said base and support surfaces.

15. A machine tool according to claim 1, further comprising drive means for rotating said third carriage about said axis of rotation, said drive means comprising an arcuate guide rail on said third carriage defined by a circular arc whose center coincides with said axis of rotation, a shaft extending radially with respect to said axis of rotation, a friction wheel on said shaft for driving said arcuate guide rail, and a motor attached to said second carriage for driving said shaft.

16. A machine tool having
    a) a rotatable support for holding a workpiece,
    b) a planar base surface,
    c) a first carriage bearing on said base surface and moveable in a first direction,
    d) a second carriage coupled to said first carriage and moveable in a second direction perpendicular to said first direction,
    e) a third carriage coupled to said second carriage and rotatable about an axis of rotation perpendicular to said first and second directions, said third carriage including a tool holder, wherein the improvement comprises:
    f) said second carriage and said third carriage have complementary cylindrical bearing surfaces defined by a circular cylinder having a centerline coinciding with said axis of rotation, said third carriage being rotatably guided about said axis of rotation by said cylindrical bearing surfaces, and
    said machine-tool further comprising a planar support surface perpendicular to said second direction and defining a line of intersection between said base and support surfaces, said first carriage comprising a first part having a static fluid bearing cooperable with said planar base surface, a second part having a static fluid bearing cooperable with said support surface, and cross-hinges comprising plate springs for coupling said first and second parts together, said hinges being arranged such that said first and second parts are rotatable relative to each other under spring force about a pivot axis which coincides substantially with said line of intersection between said base and support surfaces.

17. A machine tool according to claim 16, further comprising drive means for rotating said third carriage about said axis of rotation, said drive means comprising an arcuate guide rail on said third carriage defined by a circular arc whose center coincides with said axis of rotation, a shaft extending radially with respect to said axis of rotation, a friction wheel on said shaft for driving said arcuate guide rail, and a motor attached to said second carriage for driving said shaft.

18. A machine tool according to claim 16, wherein said said second and third carriages commonly bear on said planar base surface.

19. A machine tool according to claim 16, wherein said first and second carriages comprise complementary planar guide walls parallel to said second direction, which guide walls comprises static fluid bearings, said second carriage being guideably moveable with respect to said first carriage along said planar guide walls, and said complementary cylindrical guides of said second and third carriages comprise static fluid bearings.

20. A machine tool according to claim 19, wherein a plurality of said static bearings comprise means for biasing their respective surfaces together.

* * * * *